United States Patent [19]

Sampson et al.

[11] 4,005,155

[45] Jan. 25, 1977

[54] POLYMERIC COMPOSITIONS

[75] Inventors: Keith George Sampson, Clophill; Victor Frederick Jenkins, St. Albans; Anthony John Bunker, Kempston, all of England

[73] Assignee: Laporte Industries Limited, Luton, England

[22] Filed: Feb. 5, 1975

[21] Appl. No.: 547,215

Related U.S. Application Data

[62] Division of Ser. No. 311,528, Dec. 4, 1972, abandoned.

[30] Foreign Application Priority Data

Dec. 9, 1971 United Kingdom ............ 57175/71

[52] U.S. Cl. .............................. 260/851; 260/39 R; 260/42.29; 260/78.3 UA; 260/856; 260/901; 526/218; 526/320
[51] Int. Cl.$^2$ .................. C08L 61/26; C08L 61/20; C08L 33/08
[58] Field of Search ............ 260/851, 901, 78.3 UA

[56] References Cited

UNITED STATES PATENTS

| | | | |
|---|---|---|---|
| 3,284,417 | 11/1966 | Hostettler et al. | 260/78.3 UA |
| 3,338,860 | 8/1967 | Vasta | 260/851 |
| 3,800,006 | 3/1974 | Katayama et al. | 260/901 |

*Primary Examiner*—Wilbert J. Briggs, Sr.
*Attorney, Agent, or Firm*—Larson, Taylor and Hinds

[57] ABSTRACT

A polymeric composition comprising main chains, side chains attached thereto and crosslinking units between side chains. The main chains comprise a copolymer of two or more ethylenically unsaturated monomers at least one of which contains hydroxyl groups, the side chains comprise lactone chains attached to said hydroxyl groups and the crosslinking units comprise amino resins. The copolymers may be prepared and subsequently modified or the side chain may be attached to an ethylenically unsaturated monomer and the modified copolymer prepared directly by polymerization with other unsaturated monomers. The modified copolymers are crosslinked and cured with an amino resin.

7 Claims, No Drawings

POLYMERIC COMPOSITIONS

This is a division of application Ser. No. 311,528 filed Dec. 4, 1972, now abandoned.

The present invention relates to a process for producing polymeric compositions, to polymeric compositions and to a process for making certain modified polymers which can be used in producing the said polymeric compositions.

Some of the polymeric compositions with which the present invention is concerned are especially suitable for use as coating compositions.

Hitherto it has been proposed to manufacture a polymeric composition suitable for use as a coating composition by direct cross linking of hydroxyl-containing acrylate polymers using an amino resin. It has been recognised that such polymeric compositions require to have their flexibility increased in order to make them suitable for use as a coating composition. It has been proposed to increase their flexibility by incorporating flexibilising units such as ethyl acrylate into the acrylate polymer. However the addition of such flexibilising units decreases chemical resistance since they provide sites for attack.

According to the present invention there is provided a polymeric composition comprising (a) main chains comprising a copolymer of two or more ethylenically unsaturated monomers at least one of which contains an hydroxyl group (b) side chains, attached to at least some of the hydroxyl groups of the copolymer, comprising lactone chains, and (c) linking units comprising amino resins, as hereinafter defined, which crosslink at least some of the side chains.

The polymeric compositions of the present invention may have a particularly desirable combination of flexibility, hardness and good chemical durability not hitherto obtainable. The structure of the polymeric composition is novel in that it comprises the copolymer chains cross-linked by an amino resin which is attached to lactone chains. It is believed that the lactone chains provide the required flexibility whilst themselves being protected from attack by chemicals by virtue of their position between the amino resin and the copolymer chain.

According to another aspect of the present invention there is provided a process for the preparation of a polymeric composition which comprises crosslinking a modified copolymer with an amino resin, as hereinafter defined, wherein the modified copolymer comprises a copolymer of two or more ethylenically unsaturated monomers at least one of which contains an hydroxyl group, modified by the presence of lactone chains attached to at least some of the hydroxyl groups of the copolymer.

The modified copolymer may be prepared by the process described in British Pat. No. 1,257,638 wherein lactone is first reacted in the presence of an acidic catalyst with an hydroxyl containing ethylenically unsaturated monomer and then the unsaturated product copolymerised with another unsaturated monomer.

According to this further aspect of the present invention there is provided a process for the preparation of a modified copolymer which comprises:

a. reacting an ethylenically unsaturated hydroxyl-containing monomer with one or more ethylenically unsaturated monomers to form a copolymer containing hydroxyl side groups, and b. modifying this copolymer by reacting at least some of the hydroxyl side groups with a lactone.

The modified copolymer may be useful in the field of polyurethane manufacture and this use is exemplified in our copending application of even date.

Preferably the unmodified copolymer has an hydroxyl value of at least 20 mg KOH/g but preferably less than 250 mg KOH/g. Particularly preferably the hydroxyl value of the copolymer is from 30 to 100.

The present invention also provides according to a further aspect a process for the preparation of a polymeric composition which comprises:

a. reacting an ethylenically unsaturated hydroxyl-containing monomer with one or more ethylenically unsaturated monomers to form a copolymer containing hydroxyl side groups, b. reacting at least some of the said hydroxyl side groups with a lactone, to form a modified copolymer containing hydroxyl terminated side groups and c. reacting the modified copolymer with an "amino resin" as hereinafter defined.

The ethylenically unsaturated monomer containing an hydroxyl group may be an unsaturated alcohol such as allyl alcohol, an alkylol acrylamide such as methylol acrylamide or methylol methacrylamide or an unsaturated hydroxyalkyl ester. Preferably the hydroxyl-containing unsaturated monomer is an ethylenically unsaturated hydroxyalkyl ester. It is advantageous if the hydroxyl groups form part of $-CH_2OH$ groups and particularly advantageous if there is only one hydroxyl group per molecule.

Preferably the ethylenically unsaturated hydroxyalkyl ester referred to in the present invention has the general formula $CH_2 = CR_1-COOR_2$ wherein $R_1$ is hydrogen or an alkyl group and the group $R_2$ is an alkyl group to which one or more hydroxyl groups are attached. Preferably the group $R_1$ is hydrogen or a methyl group. Preferred esters include 2-hydroxy-ethyl acrylate, 2-hydroxy-ethyl methacrylate and 2-hydroxy-propyl methacrylate. A particularly preferred ester is 2-hydroxy-ethyl acrylate.

Preferably the or each ethylenically unsaturated monomer has the part formula $CH_2=C<$ so that it may be readily polymerised and it is advantageously a vinyl, allyl or acrylate monomer. It is advantageous if the or each of the ethylenically unsaturated monomers have no hydroxyl groups.

Examples of useful monomers having this part formula are styrene, vinyl toluene, methyl methacrylate, vinyl acetate and butyl methacrylate. Preferred monomers are styrene, vinyl toluene and methyl methacrylate, particularly preferred is styrene.

Conveniently the reaction between the ethylenically unsaturated monomers is conducted in a solvent which is advantageously a substantially water-free solvent at a temperature of from 20° C to 200° C, preferably at a temperature in the range of from 50° C to 180° C. The solvent used in this solution reaction should preferably not contain hydroxyl groups. If the solvent does contain hydroxyl groups the hydroxyl groups must be removed, preferably by removing the solvent itself, before contact with the lactone. A particularly useful solvent is xylene.

It has been found advantageous in the polymerisation to use an initiator suitable for vinyl polymerisation. Preferably such an initiator is an azo catalyst, an organic peroxygen compound such as t-butyl peracetate, an organic peroxide such as benzoxyl peroxide or an organic hydroperoxide such as t-butyl hydroperoxide. An azo catalyst which is particularly preferred in the present invention is 2,2' azo bis-2-methyl propionitrile.

Normally control of the molecular weight of the copolymer produced by this reaction is required and to obtain such control conveniently it is advantageous to add a chain transfer agent. The use of these agents is well known in the art, and it is equally well known that by varying the amount of chain transfer agent added it is possible to exert considerable control over the molecular weight of the copolymer produced. Useful and convenient chain transfer agents are carbon tetrachloride and the mercaptans.

The mode of addition of the ethylenically unsaturated monomers, solvent if used, initiator if used and chain transfer reagent if used, controls the precise product obtained. In certain embodiments of the present invention it may be convenient or desirable to begin the polymerisation by initiating a small amount, for example, less than 20 mol % of the reactants and then to add further reactants with a chain transfer agent if required and optionally, further initiator. Where it is desired to produce a uniform copolymer, the molar ratio of hydroxyl containing monomer to other monomer is desirably kept constant during their reaction.

The reaction between one or more of the hydroxyl groups on the copolymer with the lactone will result in opening of the lactone ring in the normal manner to produce a hydroxyl terminated lactone chain. A hydroxyl terminated lactone chain may react with further lactone molecules to produce a hydroxyl terminated polylactone side chain. Reference herein to a lactone chain means an hydroxyl terminated side chain of this sort whether it contains one or more lactone derived units. Thus in adding the lactone to the copolymer or unsaturated monomer it is desirable to calculate beforehand the amount of the lactone needed to give the average side chain length required. Generally it is found that the side chain length may be increased indefinitely, that is that large amounts of the lactone may be used. Also it seems likely, although this theory is not essential to exercise the invention, that many hydroxyl side chains are added on to, that is, that the lactone added does not polymerise on to a few hydroxyl groups to produce several long polylactone chains but that the lactone molecules are distributed among a large number of hydroxyl side chains. Further it has been found that over a wide range of average side chain lengths the coating compositions made from a particular modified copolymer have a flexibility which increases with the average length of the said chain in the modified copolymer. The flexibility of the coating compositions however depends not only on the average length of the side chain but also on the number of side chains there are. In the present invention the amount of lactone added (expressed as a weight percentage of the unmodified copolymer) is normally from 10% to 60%.

The term "lactone" as used herein is defined as one or more compounds each of the formula:

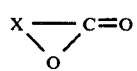

(1)

wherein X is a —$(CR_2)_n$— group, wherein $n$ is an integer of from 4 to 7 and wherein each of the 8 to 14 groups R is any group selected from hydrogen, methyl, ethyl, n-propyl, isopropyl, chlorine and bromine provided that the total number of carbon atoms in the —$(CR_2)_n$— group does not exceed 12 and provided that there are no more than 2 halogen atoms in the —$(CR_2)_n$— group. Desirably $n$ is 5 that is the lactone is an epsilon-caprolactone and particularly preferably the lactone is epsilon-caprolactone. Other preferred epsilon-caprolactones are a methyl epsilon-caprolactone, a mixture of isomeric methyl caprolactones or a mixture of isomeric methyl epsilon-caprolactones with epsilon caprolactone.

In the process whereby the copolymer is reacted with the lactone in order to effect reaction of the lactone with the side chain it is advantageous to use a catalyst and to heat the mixture comprising lactone, catalyst, and copolymer preferably under reflux in a solvent. The solvent may be the same as was used in the reaction to form the copolymer or it may be a different solvent but it must contain no hydroxyl groups. The copolymer may be prepared just before adding the lactone and it may be reacted with the lactone without removing the solvent in which it was prepared provided that solvent does not contain any hydroxyl group. Organo-tin compounds are particularly preferred catalysts for the reaction of the lactone with the copolymer and an especially preferred catalyst is dibutyl tin dilaurate. There are other known catalysts for the reaction such as alkyl titanates, organo-zirconium compounds and organic acids. The reaction temperature of the mixture is suitably from 20° C to 220° C and preferably from 120° C to 200° C. Refluxing at 120° C to 200° C is normally continued for from 6 to 24 hours or for such time as is necessary.

The mixing of the modified copolymer and the amino resin is preferably carried out in the presence of an hydroxyl containing solvent and is normally carried out in a mixture of inert solvents such as xylene and n-butanol. The hydroxyl containing solvent has been found to be important in obtaining a polymeric composition of long shelf life. The mixing is normally carried out at ambient temperature although it may be carried out at elevated temperatures. A catalyst may be added to the mixture, for example organic carboxylic or sulphonic acids; a preferred catalyst is p-toluene sulphonic acid.

The term "amino resin" is used herein as it is used in the surface coating industry and means a nitrogen containing resin containing alkoxy groups to render it soluble in organic solvent. Typical examples are urea formaldehydes, melamine formaldehydes and benzoguamine formaldehydes. More specifically amino resins for use in the present invention include those described in "Convertible Coatings" (Paint Technological Manual) Part III, pages 111–120, Encyclopaedia of Polymer Science and Technology Volume 2, pages 1–21 and 60–64, and Organic Coating Technology Volume 1 Chapter 8. A particularly convenient melamine formaldehyde is hexamethoxymethyl melamine resin but there are many other very suitable ones such as butylated melamine formaldehyde resin. Preferably the amount of amino resin which is incorporated in the modified copolymer to produce the polymeric composition is from 10% to 40% by weight of modified copolymer.

In those embodiments of the invention in which the polymeric composition is to be used as a coating composition the amino resin and the modified polymer are preferably thoroughly mixed before applying them in a suitable manner to the surface to be coated. Preferably the mixture is applied as a liquid to the surface by any convenient means and it is then normally dried. The reaction may then be completed by a curing step. A convenient method of curing is to heat the polymeric composition to a temperature in the range of from 50° C to 360° C preferably from 80° C to 300° C until the composition is a hard film.

The coating compositions comprising the polymeric composition of the present invention are suitable for use in such diverse fields as motor cars, kitchen furniture and the continuous coating of steel strips. The polymeric composition may be applied as a coating composition by any suitable method such as brushing, spraying, dipping, roller coating and the like. In its preparation pigments, dyes and/or thickeners may be added in order that the polymeric composition may be particularly suited to a specific coating use.

Should it be desired that the polymeric compositions, as described herein, contain one or more dyes, pigments or thickeners they are added before curing and are preferably thoroughly mixed such as by ball-milling with the modified polymer before mixing with the amino resin.

In order that the invention may be more clearly understood certain embodiments of the same will now be illustrated by way of example.

EXAMPLE 1, RELATING TO THE PRODUCTION OF A COPOLYMER

This relates solely to the production of the copolymer. Styrene (31.2g, 0.3 moles), 2-hydroxyethyl acrylate (3.48g, 0.03 moles) and dry xylene (180g) were introduced into a glass reaction vessel equipped with stirrer, thermometer, reflux condenser, nitrogen inlet, reagent inlets and a water trap on the condenser outlet to maintain a nitrogen atmosphere.

The reaction vessel which was provided with a nitrogen atmosphere throughout the reaction was heated to reflux the mixture at a temperature of about 150° C. 2,2' azo bis-2-methyl propionitrile (0.6g) was added to the reaction vessel to initiate polymerisation. After 10 minutes further styrene (280.8g, 2.7 moles) dissolved in dry xylene (100g) and further 2,-hydroxyethyl acrylate (31.3g, 0.27 moles) mixed with dry xylene (100g) and with further 2,2' azo bis-2-methyl propionitrile (0.6g) were pumped separately in the reaction vessel at 71 cm³/hr and 24 cm³/hr respectively.

After this further addition of reagents the reaction was continued at reflux for a further 14 hours. The product solution after dilution to 40% w/w of resin with xylene, was a clear slightly yellow liquid with a viscosity of 0.4 Ns/m² (Paint Research Station (P.R.S.) Bubble Viscometer). The hydroxyl value of the product polymer was 68 mg KOH/g.

EXAMPLE 2, RELATING TO THE PRODUCTION OF A COPOLYMER

This is identical to Example 1, and is again concerned solely with producing the copolymer, except that carbon tetrachloride (19g) was initially added to the flask before heating to act as a chain transfer agent.

The product solution obtained after dilution to 40% w/w of resin with xylene was a clear slightly yellow liquid, of viscosity 0.23 Ns/m² (P.R.S. Bubble Viscometer). The hydroxyl value of the polymer produced was 63 mg KOH/g.

EXAMPLE 3, RELATING TO THE PRODUCTION OF A MODIFIED COPOLYMER 107g of the product solution from Example 1, $\epsilon$-caprolactone (24.8g) and dibutyl tin dilaurate (0.09g) were heated together under reflux at 150° C for 9.5 hours, at which time analysis showed there to be no free caprolactone. The product obtained was a clear slightly yellow liquid. The amount of $\epsilon$-caprolactone added was 56% w/w of the unmodified copolymer.

EXAMPLE 4, RELATING TO THE PRODUCTION OF A MODIFIED COPOLYMER

This is identical to Example 3 except that 103g of product solution from Example 1 and $\epsilon$-caprolactone (12g) were used. The amount of $\epsilon$-caprolactone added was 28% w/w of the unmodified copolymer. The product solution obtained was similar to that of Example 3.

EXAMPLE 5, RELATING TO THE PRODUCTION OF A MODIFIED COPOLYMER 100g of product solution from Example 2, $\epsilon$-caprolactone (5.44g) and dibutyl tin dilaurate (0.09g) were heated together under reflux at 150° C for 12 hours. The amount of $\epsilon$-caprolactone added was 14 w/w % of the unmodified copolymer. The product solution obtained was a clear slightly yellow liquid.

EXAMPLE 6, RELATING TO THE PRODUCTION OF A POLYMERIC COMPOSITION 21.8g of the product solution from Example 3 were mixed with hexamethoxy methyl melamine (5.49g of British Industrial Plastic Ltd. (B.I.P) Resin sold as Be 670) and p-toluene sulphonic acid (0.1g) as catalyst. This was applied as a wet film to steel plates (Gold Seal Bonderite Treated, Pyrene Co. Ltd.) and to glass plates using a 0.003 inch doctor blade. The coatings were allowed to air dry for 15 minutes then cured at 120° C for 30 minutes. They produced hard, starbright and colourless films.

EXAMPLE 7, RELATING TO THE PRODUCTION OF A POLYMERIC COMPOSITION

This is identical to Example 6 except that 17.5g of product solution from Example 4 were mixed with hexamethoxymethyl melamine (3.7g). Hard, starbright, colourless films were obtained.

EXAMPLE 8, RELATING TO THE PRODUCTION OF A POLYMERIC COMPOSITION

This Example is a comparative Example and is not within the present invention, but is identical to Example 6 except that 20.9g of product solution from Example 1 were mixed with hexamethoxymethyl melamine (3.7g). Hard, starbright, colourless films were obtained.

EXAMPLE 9, RELATING TO THE PRODUCTION OF A POLYMERIC COMPOSITION 21.7g product from Example 3 was mixed with butylated melamine formaldehyde resin (8.6g of a 60% w/w solution of resin in n-butanol sold by B.I.P. Ltd. as Be 615) and after incorporation of p-toluene sulphonic acid (0.1g) as a catalyst was applied as a wet film to steel and glass plates using a 0.003 inch doctor blade.

The coatings were allowed to air dry for 15 minutes then cured at 120° C for 30 minutes. They produced colourless films of high quality, high durability and high flexibility.

EXAMPLE 10, RELATING TO THE PRODUCTION OF A PIGMENTED POLYMERIC COMPOSITION

Modified copolymer (25.2g) prepared as Example 3 was ball-milled with rutile titanium dioxide pigment (10.4g sold by Laporte Industries as RO 676) until dispersion was achieved as measured by a fineness value (Sheen Instruments Ltd.) of 0.0005 inch (7 Hegmann Scale). Pigmented resin (15.0g) was mixed with hexamethoxymethyl melamine (2.8g) as in Example 6 and subsequently treated as described in that Example.

EXAMPLE 11, RELATING TO THE PRODUCTION OF A PIGMENTED POLYMERIC COMPOSITION

Modified copolymer solution (29.1g) prepared as Example 4 was ball-milled with rutile titanium dioxide pigment (10.1g sold by Laporte Industries Ltd. as RO676) until dispersion was achieved as in Example 10.

21.5 gms of the pigmented resin was mixed with hexamethoxymethyl melamine (3.4g) as in Example 6 and subsequently treated as described in that Example.

EXAMPLE 12, RELATING TO THE PRODUCTION OF A PIGMENTED POLYMERIC COMPOSITION

This example is a comparative Example and is not within the present invention. Copolymer (28.2g) prepared as Example 1 was ball-milled with rutile titanium dioxide pigment (8.6g sold by Laporte Industries Ltd. as RO 676) until dispersion was achieved as in Example 10.

22.8 gms of the pigmented resin was mixed with hexamethoxymethyl melamine (3.1g) as in Example 6 and subsequently treated as described in that Example.

EXAMPLE 13, RELATING TO THE TESTING OF PIGMENTED POLYMERIC COMPOSITIONS

The three finishes from Examples 10, 11 and 12 were tested with a falling weight impact tester machine described in B.S. 1391. The reverse impact required to cause 50% of the panels to fail by cracking of the pigmented film was recorded as the impact strength. The results are given in Table 1.

Table 1

| Example | %, by weight of unmodified copolymer, of ε-caprolactone | Impact Strength |
| --- | --- | --- |
| 10 | 56 | pass 160" lbs |
| 11 | 28 | 158" lbs |
| 12 | 0 | 2" lbs |

The films from Example 6, 7 and 8 were subjected to the mandrel bend test for flexibility and adhesion to the base material according to B.S. 256. The hardness of the films was also determined by the Rocker Hardness apparatus and the results are expressed as a percentage of hardness of a standard glass surface. These results are given in Table 2.

Table 2

| Example | %, by weight of unmodified copolymer of ε-caprolactone | Bend Test | Rocker Hardness |
| --- | --- | --- | --- |
| 6 | 56 | pass 1/16" | 49.2% |
| 7 | 28 | fail 1/8" pass 1/4" | 50.7% |
| 8 | 0 | fail 3/4" | 74.5% |

These experiments show the superior flexibility and adhesion ability of the coating compositions produced by using modified copolymers as opposed to corresponding unmodified copolymers whilst maintaining acceptable hardness.

EXAMPLE 14, RELATING TO THE TESTING OF POLYMERIC COMPOSITIONS

The following tests were carried out on the films from Examples 6, 7 and 8 and results given in Table 3.

a. Resistance to alkali was measured by immersion in 5% by weight aqueous sodium hydroxide solution at 25° C.

b. Resistance to acetic acid was measured by immersion in 5% by weight aqueous acetic acid solution at 25° C.

c. Resistance to detergent was measured by immersion in 2% by weight aqueous "Tide" at 25° C.

d. Resistance to petrol was measured by immersion in a commercial motor fuel of octane rating 97.

The panels were examined visually and given a rating on a scale so that 10 = completely unaffected, 0 = completely destroyed.

Table 3

| Example | %, by weight of unmodified copolymer, of ε-caprolactone | Acetic Acid Rating after 100 hrs. | Alkali Rating after 24 hrs. | Detergent Rating after 200 hrs. | Petrol Rating after 24 hrs. |
| --- | --- | --- | --- | --- | --- |
| 6 | 56 | 6 | 10 | 9 | 10 |
| 7 | 28 | 8 | 10 | 8 | 10 |
| 8 | 0 | 10 | 10 | 10 | 10 |

The copolymer modified by ε-caprolactone shows very acceptable chemical durability.

EXAMPLE 15, RELATING TO THE TESTING OF PIGMENTED POLYMERIC COMPOSITIONS

The gloss of pigmented films prepared as Examples 10, 11 and 12 was determined by use of the "EEL Gloss Meter" with a High-Spec head (Evans Electroselenium Ltd.) according to Defence Specification DEF 1053 method 11. The results are recorded as a percentage of the reading obtained for a standard black tile and given in Table 4.

Table 4

| Example | %, by weight of unmodified copolymer, of ε-caprolactone | Gloss |
| --- | --- | --- |
| 10 | 56 | 95% |
| 11 | 28 | 109.6% |

Table 4 -continued

| Example | %, by weight of unmodified copolymer, of ε-caprolactone | Gloss |
|---|---|---|
| 12 | 0 | 105.0% |

The pigmented coatings in which a modified copolymer instead of an unmodified copolymer is used show acceptable gloss.

We claim:

1. A process for the preparation of a crosslinked modified copolymer having the desirable combination of flexibility, hardness and chemical durability which comprises:
   a. reacting together at least two ethylenically unsaturated monomers at least one of which is an ethylenically unsaturated hydroxyalkyl ester of formula $CH_2 = CR_1 — COOR_2$ in which $R_1$ is H or an alkyl group and $R_2$ is an alkyl group to which one or more $—CH_2OH$ groups are attached, to form a copolymer,
   b. modifying said copolymer by reacting it with from 10% to 60% by weight of an epsilon caprolactone; and
   c. crosslinking the modified copolymer of (b) with from 10% to 40% by weight of an amino resin selected from the group consisting of urea formaldehydes, melamine formaldehydes and benzoguamine formaldehydes.

2. A process as claimed in claim 1 wherein the ethylenically unsaturated hydroxyalkyl ester is selected from the group consisting of 2-hydroxyethyl acrylate, 2-hydroxyethyl methacrylate and 2-hydroxypropyl methacrylate.

3. A process as claimed in claim 1 wherein at least one of the ethylenically unsaturated monomers is selected from the group consisting of styrene, vinyl toluene and methyl methacrylate.

4. A process as claimed in claim 1 wherein the reaction of the modified copolymer and the amono resin is carried out in the presence of a hydroxyl containing solvent.

5. A process as claimed in claim 1 wherein the reaction of the modified copolymer and the amino resin is completed by curing at from 50° C to 360° C.

6. A crosslinked composition having the desirable combination of flexibility, hardness and chemical durability comprising:
   a. from 5 to 85% by weight, main chains comprising a copolymer of at least two ethylenically unsaturated monomers at least one of which is an ethylenically unsaturated hydroxyalkyl ester of formula $CH_2 = CR_1 — COOR_2$ in which $R_1$ is H or an alkyl group and $R_2$ is an alkyl group to which one or more $—CH_2OH$ groups are attached, to form a copolymer,
   b. from 5 to 85% by weight, side chains comprising lactone chains derived from an epsilon caprolactone attached to oxygen remnants of hydroxyl groups on said copolymer and
   c. from 10 to 30% by weight, linking units comprising amino resins selected from the groups consisting of urea formaldehydes, melamine formaldehydes and benzoguamine formaldehydes which crosslink said side chains.

7. A polymeric composition according to claim 6 wherein the main chains comprise a copolymer of said ethylenically unsaturated hydroxyalkyl ester and at least one ethylenically unsaturated monomer selected from the group consisting of styrene, vinyl toluene and methyl methacrylate.

* * * * *